Jan. 17, 1961
V. DVORKOVITZ ET AL
2,968,733
METHOD OF CONTAMINATION DETECTION
Filed Dec. 5, 1955
2 Sheets-Sheet 2
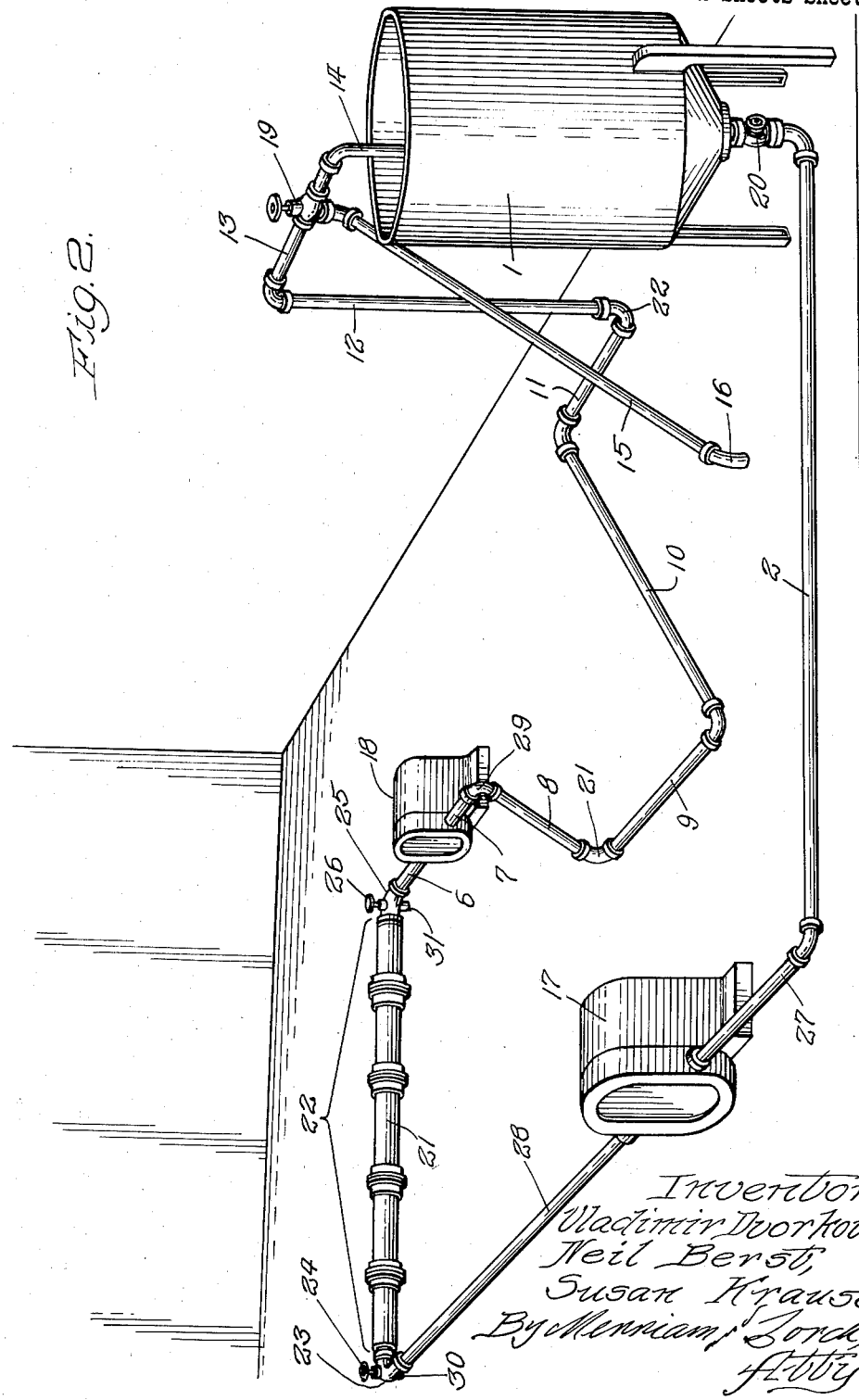

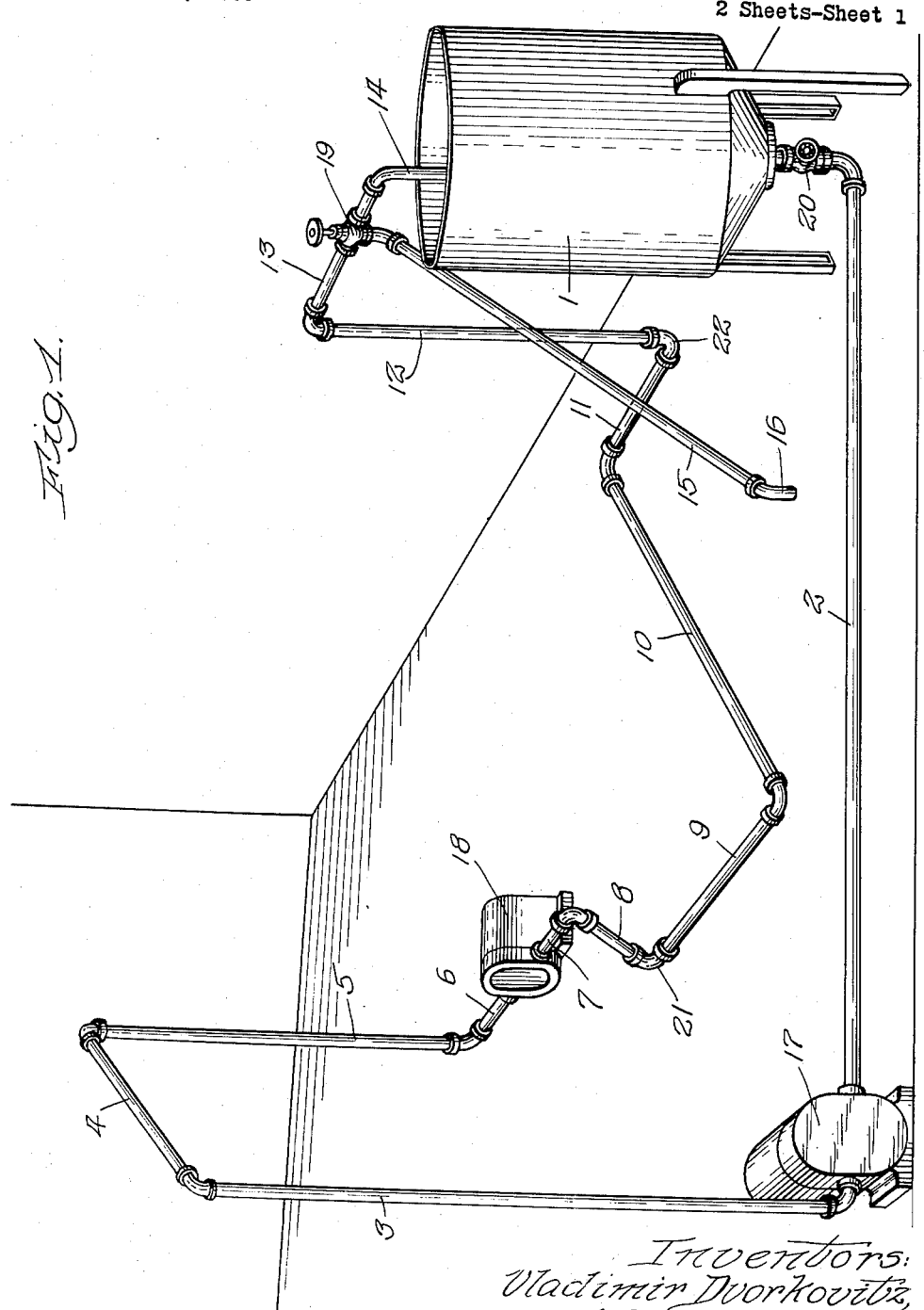

United States Patent Office 2,968,733
Patented Jan. 17, 1961

2,968,733

METHOD OF CONTAMINATION DETECTION

Vladimir Dvorkovitz, Kansas City, Mo., and Neil Berst, Evanston, and Susan Krause, Chicago, Ill., assignors to The Diversey Corporation, a corporation of Illinois Filed Dec. 5, 1955, Ser. No. 551,021

7 Claims. (Cl. 250—106)

This invention relates to a method of determining the presence of contamination and of selectively determining the location of contamination by the use of tracer solutions containing radioactive isotopes. More specifically, this invention relates to a method of determining the presence of contamination and selectively determining the location of contamination which induces or sustains bacterial activity in processing or conduit systems and the like by the use of tracer solutions containing radioactive isotopes that emit detectable gamma radiation and are capable of being selectively retained by said contamination.

The terms tracer solution and tracer solutions are intended to include tracer materials or radioactive isotopes. For example, the terms include solutions or materials tagged with a detectable gamma ray-emitting isotope plus other constituents.

In the food processing industry it is often necessary to determine whether there is any contamination in the processing or conduit systems and the like after the systems have been rinsed or washed with cleaning materials such as water and detergent solutions. The conventional bacteriological methods employed in detecting contamination (i.e., food contamination) in processing or conduit systems require at least about 48 hours. Our method contemplates the utilization of materials containing radioactive isotopes that emit detectable gamma radiation and at the same time are capable of being used to selectively locate the presence of contamination in a period as short as about ½ hour.

The present invention is particularly useful in cases wherein the equipment under surveyance cannot be visually examined as well as cases wherein sections cannot be readily separated from the system and examined.

Once the particular equipment or section containing contamination is located, said equipment may be removed from the processing or conduit system and decontaminated by treating or scrubbing same until gamma radiation emanating therefrom does not exceed, or materially exceed, background radiation. If desired, the equipment or section may be decontaminated; that is, the contaminated material plus the tracer material or solution retained by said contamination may be removed by passing cleaning material through the system until said equipment or section does not emit a substantial amount of gamma radiation.

In order to selectively locate contamination, it is essential that contamination-free surfaces of the processing or conduit system and the like do not retain substantial quantities of the tracer material or solution. Therefore, our method requires that a sufficient portion of the internal surfaces of the equipment employed in the processing or conduit system should be sufficiently hard, smooth, nonporous, cleanable and free from cracks, leaks or other similar interfering deformations so as to permit the selective detection of contamination with tracer materials or solutions. If a pump is used to circulate the tracer material through the system, the internal surface of the pump should likewise be constructed of material possessing these properties. If necessary, the tracer material or solution may also be effectively removed from defective and/or contamination-free conduits or processing equipment by the use of cleaning materials (i.e., water or detergents). In addition, it is desirable to employ processing equipment and/or a conduit system that does not tend to retain contamination or materially resist conventional cleaning procedures. Satisfactory results may be obtained with our method of contamination-detection when a sufficient portion of the internal surfaces of the system are constructed of materials such as stainless steel 302, 304 or 316 having a 2B or 4 finish, Pyrex glass, polyethylene, and the like.

The gamma radiation emitted from contamination that retains the tracer material or solution should be capable of being detected by detection devices such as a scintillation counter plus a scaler recording unit or a survey recording meter.

One of the critical features of our contamination-detection method and the tracer materials employed therein is that undesired gamma ray-emitting isotope material may be selectively removed from the system (i.e., by rinsing the system with water) without materially removing radioactive tracer material that is retained by contamination, thus enabling the detection devices to more readily locate contamination.

The particular radioactive tracer material employed in this method of selectively locating contamination should be capable of being selectively removed from the equipment or conduits and should not materially adhere to the surfaces of clean (i.e., contamination-free) equipment or conduits. The tracer material should preferably have a sufficient half-life so as to be capable of reuse and of maintaining relatively consistent, detectable activity for at least one day or more. In addition, tracer materials should preferably possess a sufficiently short half-life so as to avoid undue hazards that may result from accidental spillage and be capable of an expeditious rate of decay after being used for contamination-detection purposes.

The particular radiation energy (i.e., mev.) of the tracer material selected for use in our method of selectively locating contamination must be sufficiently great so as to penetrate through the thickness of the equipment or system being inspected and should afford safe and convenient handling and yet be capable of providing a detectable radiation count above background without requiring excessive shielding. The avoidance of materials that emit radiation of excessively high energy reduces exposure hazards as well as the reflection of radiation energy off surrounding surfaces. It is desirable to be able to detect contamination from a reasonably close distance from the equipment (i.e., about 1 to 5 feet or less). In addition, the radiation energy should be sufficiently low so as to obviate the need for employing excessive precautions in handling or storing the gamma ray-emitting tracer material.

The concentration of radioactivity (i.e., millicuries or microcuries per unit volume of solution) of the tracer solution containing the radioactive isotope must be high enough to be effectively retained by contamination. The particular concentration of radioactivity selected will depend upon the composition and thickness of the processing equipment or conduit system and the amount of radioactive energy of the isotope that is employed in the tracer solution. The amount of radioactivity that is retained by the contamination may be increased by increasing the radioactivity concentration of the tracer solution. By increasing the rate of flow of the tracer solution through the system and length of time which it is permitted to contact contamination, the contamination will have a greater opportunity for retaining the tracer material or solution.

Gamma ray-emitting radioactive isotopes such as $I^{131}$ may be incorporated into the tracer solution and used in our contamination-detection method. For example, compounds such as diiodofluorescein tagged with $I^{131}$ have been found to produce satisfactory results in contamination-detection. If desired, tracer solutions containing $Br^{82}$ and $K^{42}$ and the like may be used. It is desirable that the particular material with which the radioactive isotope is combined or used be capable of being dissolved in a liquid carrier or vehicle; for economic reasons, the material containing the isotope should be soluble in an aqueous solution.

Radioactive isotopes such as $Na^{22}$ may be contained in the tracer solution if an isotope having a long half-life is desired, such as for experimental purposes.

Improved results may be obtained if the tracer solution contains (a) a salting-out agent that induces the adsorption and/or absorption of the radioactive isotope-containing compound or material onto contamination and/or (b) anionic and/or nonionic low-foaming wetting agents that tend to minimize the retention of the tracer material or solution on contamination-free surfaces of the equipment, conduits or other elements of the system.

Salting-out agents, such as sodium carbonate, sodium sulfate, sodium tripolyphosphate, and the like, satisfactorily induce the precipitation of the tracer material or solution onto contamination.

Wetting agents such as Triton X–100 (isooctylphenyl ether of decaethylene glycol) produced by Rohm and Haas Co., Hyonic P.E.–225 (a polyoxyethylene condensate of mixed fatty and rosin acids), produced by Nopco Chemical Co., and the like may be used to minimize the retention of the tracer material or solution on clean surfaces.

In addition, mixtures of salting-out agents and wetting agents may be used, such as Oronite D–40, produced by Oronite Chemical Co. (about 40% by weight sodium dodecylbenzenesulfonate and about 60% by weight sodium sulfate) as well as a mixture of a catalyst such as sodium sulfate plus a polyoxypropylene-polyoxyethylene-type non-ionic surface-active agent such as Pluronic-type materials (i.e., as illustrated in U.S. Patent No. 2,674,619) marketed by Wyandotte Chemicals Corporation and as exemplified by Pluronic L–62

$$[HO(C_2H_4O)_a(C_3H_6O)_b(C_2H_4O)_cH]$$

having a molecular weight of about 2000], and the like.

In addition to the above materials, the tracer solution may contain, if desired, an antifoam component such as D.C. Antifoam A (dimethyl siloxane) produced by Dow Corning Corp. However, in selecting an antifoam component, care should be exercised in order to avoid materials that will result in their being precipitated out of solution onto the equipment being examined.

Since the radioactivity of the tracer material will diminish with time, its radioactivity may be replenished by the addition of more radioactive tracer material (so as to maintain a desired or effective radiation concentration), and the solution may be recycled or recirculated through the system.

The volume of the radioactive tracer solution should be sufficiently great so as to provide effective contact of said tracer solution with the surfaces of the system being examined. The volume of the tracer solution may in many cases be reduced by spraying readily accessible internal surfaces of the equipment under examination.

In the accompanying drawings:

Figure 1 is a diagrammatic perspective view of the system employed in the tests set forth in hereinafter described Example 1; and Figure 2 is a diagrammatic perspective view of the system employed in the tests set forth in hereinafter described Example 3.

In a preliminary experiment a small pilot plant was set up consisting of a pump, a 10-gallon kettle, and a stainless steel pipe 4 feet long. Cooked pea slurry was circulated through this closed system for one day. External heat was applied locally over a small area on the pipe in order to insure deposition of contamination. The system was drained and rinsed with two 5-gallon portions of water which was also drained off. $NaI^{131}$ solution of a concentration of 1.6 millicuries per gallon was circulated through the system for ten minutes. The system was again rinsed with two 5-gallon portions of water. The pipe was then counted at various points. The system was then washed by circulating through it a 2 oz. per gallon alkaline detergent solution for twelve minutes. The system was again rinsed with water and drained. The same points were counted again.

TABLE I

| No. | Location Counter | Counts per Minute Before Cleaning | Counts per Minute After Cleaning |
| --- | --- | --- | --- |
| 1 | 1 | 3,712 | 640 |
| 2 | 2 | 2,240 | 576 |
| 3 | 3 | 3,584 | 704 |
| 4 | 4 | 4,544 | 576 |
| 5 | 5 | 3,200 | 512 |
| 6 | Background | 400 | 400 |

It was observed that all the counts which were substantially above background after contamination were in close proximity to the heated area, the point having the highest count, i.e., 4, being the exact point where heat was applied.

It will also be noted that after cleaning the counts were reduced to practically background. These tests, therefore, show a definite retention of radioactivity by the contaminated surface and reduction of activity to background on the surfaces after cleaning.

Referring to Figure 1, the steel kettle 1 (stainless steel 316–4) has about a 30 gallon capacity, a wall thickness of about ¼ inch and is adapted to be fitted with a mixer and heated with steam. The pipes are stainless steel 316–2B pipes having an outside diameter of about 1.5 inches and a wall thickness of about 0.05 inch. The flow through the system starts from tank 1, continues through pipe 2 to the large Waukesha pump 17, continues through pipes 3, 4, 5 and 6 to the small Waukesha pump 18 and returns to the tank through pipes 7, 8, 9, 10, 11, 12, 13 and 14. A valve 19 is placed in the return line 13 just before it enters the top of the tank in order to permit emptying of the system. If desired, the tracer solution may be reused for subsequent runs by adjusting the valve 19 and removing the tracer solution from the system through pipes 15 and 16. About 1 gallon of liquid is retained in the pipes after the system is drained through the outlet 16. This system was used in the tests set forth in Example 1.

*Example 1*

In order to assure the retention of contamination within the system, sections of pipe were removed from the system, coated with the cooked product being tested, and heated in an oven until contamination was thoroughly baked onto the pipes. The pipes were then placed in their respective positions in the system and the various tests were started. This procedure permits an evaluation of sections of contaminated and clean pipe with reasonable control over both conditions.

Water was then run through the system to check for leaks and to remove any loose contamination. Thus, only the tenacious baked-on contamination remained for the final test with $NaI^{131}$ solution. The system was then drained and about 5 gallons of fresh water was added to the tank. The total volume within the system was thus about 6 gallons. Various concentrations of $NaI^{131}$ were circulated through the system on the basis of a volume of about 6 gallons of solution. The NaI¹³¹ was added to the tank and circulated in the system. After the tracer solution was removed from the system, the system was rinsed three times with clear water and surveyed for radioactivity with a scintillation counter. At this point all unshielded radioactive sources were completely removed from the vicinity of the system.

The following detergent was used for decontaminating clean and food-contaminated stainless steel pipes:

| | Percent by weight |
|---|---|
| Sodium carbonate | 59.77 |
| Sodium tripolyphosphate | 22 |
| Sodium metasilicate pentahydrate | 16 |
| Sodium dodecylbenzenesulfonate | 1 |
| Octylphenylpolyoxyethylene ether | 1 |
| Carboxymethylcellulose | 0.23 |

The following tests in Example 1 were run using a baked-on contamination applied as previously described. Sections of pipe were removed from the system and coated with cooked food which was baked-on in order to assure the known locations of contamination.

In Test No. 1 pipes 6 and 8 were removed from the system, coated with fruit dessert which was baked-on and placed back into their respective positions in the system. About 10 gallons of water was circulated through the system for about 2 minutes to check for leaks. The system was then drained and an additional 5 gallons of water was added to the system to give a total volume of about 6 gallons of water within the system (an allowance of about 1 gallon is made for hold-up in the pipes following draining. About 8.4 millicuries of NaI¹³¹ was placed into the tank 1. The resulting solution was circulated for about 15 minutes and the system was subsequently drained and rinsed with three 10 gallon portions of water. Various points in the system were checked by holding the scintillation counter at a distance of about one foot. The results of this test are shown in Table II.

TABLE II

| No. | Location Counted (From 1') | Counts per minute |
|---|---|---|
| 1 | Pipe 5 | 576 |
| 2 | Pipe 6 (contaminated with fruit dessert) | 1,216 |
| 3 | Pipe 7 | 960 |
| 4 | Small Pump 18 | 5,504 |
| 5 | Pipe 8 (contaminated with fruit dessert) | 4,930 |
| 6 | Pipe 9 | 384 |
| 7 | Pipe 4 | 328 |
| 8 | Large Pump 17 | 392 |
| 9 | Background | 320 |

The background reading of Test No. 1 was obtained after the equipment was contacted with the tracer solution, drained, and rinsed. This reading is somewhat higher than the background level obtained before such a test is made due to the contribution to the overall activity from the pump 18 and the contaminated pipes. When all of the equipment was decontaminated and no isotopes were present in the room, the background was 250-260 counts per minute, which is normal background obtained with the scintillation counter.

As indicated in Table II, contaminated pipes 6 and 8 gave (high) counts that were easily determinable over the background level.

It was found that some loose contamination lodged in the small pump 18 was one factor contributing to the rather high activity at this point. Upon the disassembly and examination of pump 18, it was found that the rough and porous condition of the face plate caused it to retain a rather high radioactive count. Since pipes 6 and 8 were contaminated in the same manner, the recorded count of pipe 8 when read on the side adjacent to the pump 18 was probably partially influenced by reflection from the small pump 18. This conclusion was verified by noting the count of the same pipe on the side opposite the pump; the result was only 1,216 counts per minute.

When the pump 18 was partially shielded with lead bricks the pipe 8 gave only 2,942 counts per minute on the side adjacent the pump 18 compared to 4,930 counts per minute without shielding. This appears to further indicate the importance of eliminating stray activity from the area being surveyed.

A number of points in Test No. 1 that were known to be clean such as pipes 9 and 4 as well as the large pump 17 gave counts virtually equal to background.

Test No. 2 was a survey of the same points shown in Table II; however, the scintillation counter was used at a distance of only about two inches from the equipment instead of one foot. The results from this survey are shown in Table III.

TABLE III

| No. | Location Counted (From 2") | Counts per Minute |
|---|---|---|
| 1 | Pipe 5 | 448 |
| 2 | Pipe 6 | 3,840 |
| 3 | Pipe 7 | 960 |
| 4 | Small Pump 18 | 15,744 |
| 5 | Pipe 8 | 3,060 |
| 6 | Pipe 9 | 360 |
| 7 | Pipe 4 | 320 |
| 8 | Large Pump 17 | 400 |
| 9 | Background | 320 |

The data tabulated in Table III appears to indicate that the scintillation counter serves as a shield when used close to the surface being surveyed. For example, the pipe 8 does not have the high count from reflection that is shown in Table II. In general, it may be concluded that the differences between contaminated and uncontaminated areas are more sharply defined by holding the scintillation counter close to the area being surveyed. Such a method appears to have the additional advantage of providing some shielding from stray activity by the bulk of the scintillation counter itself.

Before starting the remaining series of tests in Example I, the small pump 18 was decontaminated with a boiling solution of 4 ounces per gallon of a 95% by weight caustic and 5% by weight sodium tripolyphosphate mixture.

Test No. 3 was run using (a) fruit dessert, (b) vegetable, liver and bacon soup, and (c) sweet potatoes baked onto separate sections of the system (e.g., pipe 6 was contaminated with fruit dessert; pipe 11 was contaminated with sweet potatoes; pipe 8 and elbow 21 were contaminated with soup). Water was run through the system to check for leaks. About 6 gallons of tracer solution containing about 5.0 millicuries of NaI¹³¹ was circulated in the system for about 30 minutes. The system was drained, rinsed and surveyed. The data obtained from this test is shown in Table IV. The scintillation counter was held 2 inches from the area being surveyed.

TABLE IV

| No. | Location Counted (From 2 in.) | Counts per Minute |
|---|---|---|
| 1 | Pipe 11 (contaminated with sweet potatoes) | 832 |
| 2 | Pipe 9 | 384 |
| 3 | Pipe 8 (contaminated with soup) | 704 |
| 4 | Elbow 21 (contaminated with soup) | 896 |
| 5 | Pipe 6 (contaminated with fruit dessert) | 896 |
| 6 | Small Pump 18 | 5,696 |
| 7 | Pipe 4 | 384 |
| 8 | Large Pump 17 | 412 |
| 9 | Background | 256 |

The data shown in Table IV effectively illustrates that contamination may be detected and located by use of tracer solutions and our contamination-detection method. Each of the contaminated pipes gave activity counts of 700–900 counts per minute while the uncontaminated pipes showed 384 counts.

The small pump 18 again gave a rather high count, and it was found that a considerable amount of loose contamination had settled in the pump. Care was taken to count all other portions of the system from such a position that reflection from the pump 18 was minimized. It was found that the metal in the housing of the small pump retained a rather high level of activity after being subjected to a normal cleaning procedure. This indicates the desirability of employing equipment having nonporous, smooth, hard surfaces in the system. The large pump 17 retained practically no activity, thus indicating that pumps may be used in the system without jeopardizing contamination-detection.

*Example 2*

Duplicate 1 inch square coupons of various stainless steels were precleaned for 5 minutes in a cleaning solution (e.g., boiling aqueous solution containing 4 ounces per gallon of a 95% caustic and 5% sodium tripolyphosphate solution), rinsed with water, dried, contaminated on one side with food, and again dried. One of each duplicate coupon was suspended for 2 minutes in a stirred solution of $NaI^{131}$ containing an additive (i.e., salting-out agent and/or wetting agent) while the remaining coupon was suspended in a $NaI^{131}$ solution that did not contain an additive. The concentration of each of the $NaI^{131}$ solutions was about 200 microcuries per liter. The coupons were then rinsed by dipping them in three successive beakers of water; following rinsing, the coupons were counted on both sides with a halogen tube counter. Since a halogen tube counter is generally sensitive only to beta radiation, it is possible to get accurate counts of both the contaminated and uncontaminated sides of the coupons with this instrument; beta radiation is shielded by the steel coupon so that the counter only registers the activity which it directly "sees," e.g., the surface that faces the counter.

This procedure was followed in Test No. 1; however, minor modifications, as hereinafter described, were made in performing some of the other tests set forth in this example.

Test No. 1 was run using (a) vegetable, liver and bacon soup, (b) chocolate custard, and (c) prunes as the source of contamination. Table V indicates the beneficial results that are obtained with the use of the materials therein indicated. The concentration of the additive is based upon the weight of the final solution which contains the additive, water, and $NaI^{131}$

TABLE V (TEST NO. 1)

| Sample No. | Name of Additive | Concentration of Additive, Percent | Concentration of Activity, Microcuries per Liter | Type of Food Contamination | Type and Finish of Stainless Steel | Counts Per Minute | | | |
|---|---|---|---|---|---|---|---|---|---|
| | | | | | | With Additive | | Without Additive | |
| | | | | | | Contaminated Side | Clean Side | Contaminated Side | Clean Side |
| 1 | Na₂CO₃ | 8 | 240 | Vegetable, Liver and Bacon. | 321-2D | 491.0 | 16.8 | 366.7 | 485.4 |
| 2 | Na₂CO₃ | 8 | 240 | ___do___ | 405-1 | 597.6 | 18.2 | 805.8 | 311.4 |
| 3 | Na₂CO₃ | 8 | 220 | Chocolate Custard | 316-2B | 886.6 | 14.2 | 281.1 | 92.5 |
| 4 | Na₂CO₃ | 10 | 220 | Prunes | 304-2B | 2,108.7 | 130.0 | 1,431.2 | 64.5 |
| 5 | Na₂CO₃ | 10 | 220 | ___do___ | 304-2B | 2,640.1 | 83.3 | 1,899.1 | 347.0 |
| 6 | Na₂CO₃ | 10 | 220 | ___do___ | 304-2B | 4,484.3 | 174.5 | 2,616.3 | 972.9 |
| 7 | Na₂CO₃ | 10 | 220 | ___do___ | 410-1 | 3,873.5 | 100.8 | 345.7 | 64.2 |
| 8 | Na₂CO₃ | 10 | 220 | ___do___ | 410-1 | 3,783.6 | 88.9 | 1,387.2 | 238.0 |
| 9 | Na₂CO₃ | 10 | 220 | ___do___ | 410-1 | 2,241.6 | 84.0 | 1,445.2 | 562.2 |
| 10 | Na₂CO₃ | 10 | 220 | ___do___ | 302-4 | 2,753.7 | 118.5 | 946.4 | 29.5 |
| 11 | Na₂CO₃ | 10 | 220 | ___do___ | 302-4 | 2,675.7 | 110.5 | 1,722.3 | 247.0 |
| 12 | Na₂CO₃ | 10 | 220 | ___do___ | 430-2B | 3,466.3 | 64.5 | 1,364.0 | 62.8 |
| 13 | Na₂CO₃ | 10 | 220 | ___do___ | 430-2B | 3,390.6 | 60.2 | 850.2 | 92.4 |
| 14 | Na₂CO₃ | 8 | 200 | ___do___ | 430-2B | 804.3 | 12.4 | 420.8 | 23.7 |
| 15 | Na₂CO₃ | 8 | 200 | ___do___ | 405-1 | 867.3 | 14.7 | 580.9 | 20.7 |
| 16 | Oronite D-40 | 2 | 160 | ___do___ | 302-4 | 2,219.8 | 87.6 | 714.0 | 39.1 |
| 17 | ___do___ | 2 | 160 | ___do___ | 302-4 | 2,387.8 | 56.6 | 1,179.8 | 44.4 |
| 18 | ___do___ | 2 | 160 | ___do___ | 302-4 | 2,461.4 | 72.3 | 1,245.5 | 75.2 |
| 19 | ___do___ | 2 | 160 | ___do___ | 316-2B | 1,192.8 | 40.0 | 458.9 | 38.9 |
| 20 | ___do___ | 2 | 160 | ___do___ | 316-2B | 2,564.8 | 69.3 | 1,265.4 | 49.6 |
| 21 | ___do___ | 2 | 160 | ___do___ | 321-2D | 1,974.8 | 54.2 | 1,223.3 | 575.7 |
| 22 | ___do___ | 2 | 160 | ___do___ | 405-1 | 1,369.8 | 123.8 | 502.1 | 36.7 |
| 23 | ___do___ | 2 | 160 | ___do___ | 405-1 | 2,335.9 | 32.6 | 1,115.1 | 31.9 |
| 24 | ___do___ | 2 | 160 | ___do___ | 405-1 | 2,317.4 | 75.6 | 1,229.7 | 66.1 |
| 25 | ___do___ | 2 | 160 | ___do___ | 302-2B | 2,746.8 | 172.8 | 387.6 | 60.1 |
| 26 | ___do___ | 2 | 160 | ___do___ | 302-2B | 2,631.8 | 60.5 | 1,209.3 | 44.0 |
| 27 | ___do___ | 2 | 160 | ___do___ | 302-2B | 2,258.4 | 55.0 | 1,261.4 | 92.0 |

In Test Nos. 2–5, ¾ inch diameter circular discs of type 304-2B stainless steel were used, and prunes that were dried onto the discs by the application of heat were used for contamination. However, each of said tests required the use of different solutions.

Test No. 2 involved the use of $NaI^{131}$ at a concentration of 100 microcuries per liter of solution. Table VI shows the readings that were obtained in solution No. 1 which had a $NaI^{131}$ concentration of 100 microcuries per liter of solution plus 5% by weight (based upon the total weight of the water, $NaI^{131}$, plus sodium tripolyphosphate) sodium tripolyphosphate, and solution No. 2 which contained $NaI^{131}$ at a concentration of 100 microcuries per liter of solution. The data set forth in Table VI indicates that sodium tripolyphosphate appreciably increases the amount of activity retained by contamination and tends to reduce the amount of activity retained on clean surfaces.

TABLE VI (TEST NO. 2)

*Counts per minute*

| Solution No. 1 | | Solution No. 2 | |
|---|---|---|---|
| 100 mc./liter $NaI^{131}$+5% STPP | | 100 mc./liter $NaI^{131}$ | |
| Contaminated Side | Clean Side | Contaminated Side | Clean Side |
| 1,324.8 | 86.4 | 935.6 | 264.1 |
| 1,024.8 | 94.7 | 893.3 | 264.2 |
| 1,004.5 | 87.7 | 906.7 | 169.6 |
| 1,019.8 | 46.3 | 978.8 | 434.8 |
| 1,207.8 | 92.7 | 902.5 | 108.4 |
| 1,080.8 | 134.7 | 788.5 | 257.0 |
| 1,236.8 | 129.8 | 925.4 | 270.7 |
| 1,107.8 | 143.5 | 770.1 | 160.6 |
| 1,307.8 | 59.6 | 668.8 | 68.6 |
| 1,269.8 | 96.1 | 664.2 | 100.4 |
| 1,326.8 | 141.2 | 861.1 | 110.7 |

In Test No. 3, the test solutions had a $NaI^{131}$ concentration of 124 microcuries per liter of solution. Table VII indicates the readings that were obtained with solution No. 1 which had a NaI$^{131}$ concentration of 124 microcuries per liter of solution plus 2% by weight (based upon the total weight of the water, NaI$^{131}$, plus Oronite D–40) Oronite D–40, and solution No. 2 which contained NaI$^{131}$ at a concentration of 124 microcuries per liter of solution. The data tabulated in Table VII indicates that Oronite D–40 appreciably increases the amount of activity retained by contamination and at the same time appreciably reduces the amount of activity retained on clean surfaces.

TABLE VII
(TEST NO. 3)

*Counts per minute*

| Solution No. 1 containing 124 mc./liter NaI$^{131}$+2% Oronite D-40 | | Solution No. 2 containing 124 mc./liter NaI$^{131}$ | |
|---|---|---|---|
| Contaminated Side | Clean Side | Contaminated Side | Clean Side |
| 1,950.7 | 61.4 | 832.0 | 136.9 |
| 2,374.7 | 102.2 | 897.4 | 117.0 |
| 2,218.7 | 115.5 | 1,076.6 | 101.1 |
| 2,516.7 | 119.7 | 1,167.8 | 92.0 |
| 2,494.7 | 74.3 | 944.7 | 259.1 |
| 1,530.7 | 86.7 | 1,056.3 | 204.5 |
| 1,732.7 | 81.0 | 669.9 | 195.2 |
| 1,683.7 | 71.6 | 1,062.2 | 94.5 |
| 1,466.7 | 32.6 | 983.0 | 134.5 |
| 1,539.7 | 43.1 | 887.7 | 96.6 |
| 1,625.7 | 74.3 | 714.7 | 233.1 |
| 1,613.8 | 43.4 | 845.7 | 92.0 |

Test No. 4 was conducted using separate solutions, each of which contained NaI$^{131}$ at a concentration of 100 microcuries per liter of solution. In addition to NaI$^{131}$, solution No. 1 contained 1% by weight (based on the total weight of the water, NaI$^{131}$ and Neutralized Compound XF) Neutralized Compound XF (contains 90% by weight sodium dodecyl benzene sulfonate and 10% by weight sodium sulfate); solution No. 2 contained 1% by weight Neutralized Compound XF plus 1.4% by weight sodium sulfate (based on the total weight of the water, NaI$^{131}$, Neutralized Compound XF and sodium sulfate) in addition to NaI$^{131}$, solution No. 3 was an aqueous solution of NaI$^{131}$. The ratio of sodium dodecyl benzene sulfonate to sodium sulfate in solution No. 2 was about the same as in Oronite D–40. The results of this test are tabulated in Table VIII. The data in Table VIII indicates that solution Nos. 1 and 2 (with the additive) were considerably more effective than solution No. 3. That is, solution Nos. 1 and 2 gave higher readings on the contaminated side of the discs and lower readings on the clean side of the discs. Solution No. 2 which contains 1.4% of added sodium sulfate was considerably more effective in raising the retention of NaI$^{131}$ on contaminated surfaces than solution No. 1; however, solution No. 1 gave somewhat lower counts on clean surfaces than was obtained with solution No. 2.

TABLE VIII
(TEST No. 4)

| Solution No. 1 containing 100 mc./liter NaI$^{131}$+1% Neutralized Compound XF | | Solution No. 2 containing 100 mc./liter NaI$^{131}$+1% Neutralized Compound XF+1.4% Sodium Sulfate | | Solution No. 3 containing 100 mc./liter NaI$^{131}$ | |
|---|---|---|---|---|---|
| Contaminated Side | Clean Side | Contaminated Side | Clean Side | Contaminated Side | Clean Side |
| 692 | 28 | 973 | 52 | 489 | 296 |
| 592 | 26 | 744 | 45 | 552 | 427 |
| 657 | 25 | 982 | 30 | 516 | 202 |
| 517 | 12 | 903 | 27 | 519 | 182 |
| 589 | 15 | 801 | 55 | 371 | 114 |
| 569 | 24 | 985 | 49 | 424 | 160 |
| 636 | 20 | 1,052 | 27 | 364 | 179 |
| 599 | 45 | 1,063 | 38 | 482 | 220 |

Test No. 5 was run in order to determine the effect of 2% by weight (based upon the total weight of NaI$^{131}$, sodium sulfate, and water) sodium sulfate upon the retention of NaI$^{131}$ on contamination. Solution No. 1 contained 2% sodium sulfate plus NaI$^{131}$ at a concentration of 72 microcuries per liter of solution, whereas solution No. 2 merely contained NaI$^{131}$ at a concentration of 72 microcuries per liter of solution. The data from this test, as shown in Table IX, indicates that sodium sulfate effectively increases the retention of NaI$^{131}$ on contamination.

TABLE IX
(TEST NO. 5)

*Counts per minute*

| Solution No. 1 containing 72 mc./liter NaI$^{131}$+2% Sodium Sulfate | | Solution No. 2 containing 72 mc./liter NaI$^{131}$ | |
|---|---|---|---|
| Contaminated Side | Clean Side | Contaminated Side | Clean Side |
| 408.0 | 43.0 | 225.4 | 37.9 |
| 312.3 | 9.6 | 233.3 | 45.0 |
| 429.2 | 13.7 | 190.1 | 29.3 |
| 328.8 | 11.4 | 204.0 | 279.3 |
| 271.9 | 22.5 | 217.8 | 134.5 |
| 297.0 | 22.1 | 247.3 | 152.3 |
| 333.8 | 10.8 | 344.7 | 49.2 |
| 353.5 | 17.4 | 238.9 | 277.0 |

In Test No. 6, type 302–4 stainless steel panels (2 inches x 4 inches) were coated on both sides with baked-on fruit dessert. The coated panels were then placed in the radioactive solution for one minute, rinsed under running water for 15 seconds, drained, and counted by placing them at a set distance from a Geiger-Muller tube. The panels which were placed in solution Nos. 1 and 2 were treated simultaneously so that variable factors such as time, or the temperature of the rinsing water would be constant. Solution Nos. 1 and 2 contained NaI$^{131}$ at a concentration 100 microcuries per liter of solution. However, solution No. 1 also contained 1/10% by weight additive (contains 3 parts by weight Pluronic L–62 for each part by weight of sodium sulfate). The results of this test are shown in Table X. The data tabulated in this table indicates that an additive containing Pluronic L–62 plus a precipitating catalyst such as sodium sulfate serves to increase the retention of NaI$^{131}$ on contamination.

TABLE X
(TEST NO. 6)

*Counts per minute*

| Solution No. 1 containing 100 mc./liter NaI$^{131}$+1/10% of additive containing 75% Pluronic L-62+25% Na$_2$SO$_4$ | Solution No. 2 containing 100 mc./liter NaI$^{131}$ |
|---|---|
| 1,008 | 652 |
| 1,090 | 424 |
| 930 | 569 |
| 943 | 477 |
| 941 | 544 |
| 1,218 | 361 |
| 1,364 | 704 |
| 1,325 | 514 |
| 987 | 348 |
| 849 | 298 |
| 1,065 | 512 |
| 1,156 | 644 |

Figure 2 is a diagrammatic perspective view of the type of system employed in Example 3. This system generally corresponds to the system illustrated in Figure 1; however, the flow from the large pump 17 to the small pump 18 has been altered. As shown in Figure 2, the flow from the pump 17 continues through pipe 28, elbow 23, section 22, elbow 25 and pipe 6 to the small pump 18. The flow from the small pump 18 to outlet 16 and the tank 1 is similar to Figure 1.

Pipe 28 is type 316–2B stainless steel pipe having an outside diameter of about 1.5 inches and a wall thickness of about 0.05 inch. Elbows 23 and 25 have drain outlets 30 and 31, which are controlled by valves 24 and 26 respectively.

Section 22 is constructed of several dairy pipes that are coupled by a variety of fittings that are representative of the types commonly employed by the dairy industry. Pipe 21 is a Pyrex glass pipe having an inside diameter of about 1.5 inches and a wall thickness of about 5/32 inch; the remaining pipes of section 22 are type 304–4 stainless steel pipes having an inside diameter of about 1.403 inches and a wall thickness of about 0.051 inch.

*Example 3*

The following test indicates that when material such as Oronite D–40 is incorporated with radioactive material such as $NaI^{131}$, lower concentrations of $NaI^{131}$ may be used in order to determine the presence of contamination as well as its location:

One pipe that is located between section 22 and the small pump 18 is contaminated with baked-on fruit dessert, while a second pipe which is located between the pump 18 and the tank 1 is contaminated with baked-on sweet potatoes.

A radioactive solution containing about 1.7 millicuries of $NaI^{131}$ per 6 gallons of solution containing ½% of Oronite D–40 is then circulated within the system for 5 minutes. In order to prevent excessive foaming, a small amount of D.C. Antifoam A may be added to the solution.

Readings may then be taken of section 22, the contaminated pipes and the joints located at the extremities of said contaminated pipes with a scintillation counter and survey recording meter. The results of these readings will indicate that the location of food contamination may be determined with a tracer solution of a relatively low radioactive concentration when materials such as Oronite D–40 are incorporated in the tracer solution.

When the same contaminated pipes and procedure are used with tracer solution containing a $NaI^{131}$ concentration of about 1.7 millicuries per 6 gallons of solution containing ½% of Oronite D–40, substantially similar readings will be obtained as those recorded when the concentration of $NaI^{131}$ is 3.4 millicuries per 6 gallons of solution.

This application is a continuation-in-part of our copending application Serial No. 542,173, filed October 24, 1955, now abandoned.

The radioactive tracer compositions disclosed herein are claimed in our copending divisional application entitled "Contamination Detection Compositions."

The term "system" shall hereinafter refer to equipment (i.e., processing equipment, conduits, pumps, etc.) in which the presence of contamination as well as its location may be determined by utilizing tracer solutions containing detectable gamma radiation in the manner herein described.

The phrase "promotes bacterial activity," when used with reference to contamination, shall hereinafter refer to contamination that induces or sustains bacterial activity.

Although the present invention has been described in conjunction with preferred embodiments, it is to be understood that modifications and variations may be resorted to without departing from the spirit and scope of the invention as those skilled in the art will readily understand. Such variations and modifications are considered to be within the purview and scope of the invention and the appended claims.

We claim:

1. A method of determining the presence of contamination and selectively determining the location of contamination which promotes bacterial activity in a system comprising: contacting the surfaces of the system that are being examined with a tracer solution containing a salting-out agent and a gamma ray-emitting radioactive isotope that is salted-out on and selectively retained by contamination and at the same time emits a detectable and effective amount of gamma radiation, while controlling the concentration and radiation energy of said isotope to provide a selective amount of gamma radiation of a selective level of radiation energy for point determination of the focus of contamination, removing undesired gamma ray-emitting isotope material from the system, and selectively determining the location of contamination when contamination is detected in said system.

2. A method of determining the presence of contamination and selectively determining the location of contamination which promotes bacterial activity in a system comprising: contacting the surfaces of the system that are being examined with a tracer solution containing a salting-out agent and a gamma ray-emitting radioactive isotope that is salted-out on and selectively retained by contamination and at the same time emits a detectable and effective amount of gamma radiation, while controlling the concentration and radiation energy of said isotope to provide a selective amount of gamma radiation of a selective level of radiation energy for point determination of the focus of contamination, removing undesired gamma ray-emitting isotope material from the system, selectively determining the location of contamination from detecting positions outside the system when contamination is detected in said system, and removing undesired detected contamination from the system.

3. A method of determining the presence of contamination and selectively determining the location of contamination which promotes bacterial activity in a food processing system comprising: contacting the surfaces of the system that are being examined with tracer solution containing a gamma ray-emitting radioactive isotope that is selectively retained by contamination and at the same time emits a detectable and effective amount of gamma radiation, while controlling the concentration and radiation energy of said isotope to provide a selective amount of gamma radiation of a selective level of radiation energy for point determination of the focus of contamination, removing undesired gamma ray-emitting isotope material from the system, and selectively determining the location of contamination from detecting positions outside the system when contamination is detected in said system.

4. A method of determining the presence of contamination and selectively determining the location of contamination which promotes bacterial activity in a system as set forth in claim 3 wherein the tracer solution contains an aqueous carrier.

5. A method of determining the presence of contamination and selectively determining the location of contamination which promotes bacterial activity in a system as set forth in claim 3 wherein the tracer solution contains $I^{131}$.

6. A method of determining the presence of contamination and selectively determining the location of contamination which promotes bacterial activity in a system as set forth in claim 3 wherein the tracer solution contains $NaI^{131}$.

7. A method of detecting contamination and removing said detected contamination from a food processing system comprising: contacting the surfaces of the system that are being examined with tracer solution containing a gamma ray-emitting radioactive isotope that is selectively retained by contamination and at the same time emits a detectable and effective amount of gamma radiation, while controlling the concentration and radiation energy of said isotope to provide a selective amount of gamma radiation of a selective level of radiation energy for point determination of the focus of contamination, removing undesired gamma ray-emitting isotope material from the system, selectively determining the location of contamination from detecting positions outside the system when contamination is detected in said system, and removing undesired detected contamination from the system.

References Cited in the file of this patent

UNITED STATES PATENTS

| | | |
|---|---|---|
| 1,791,199 | Gardner | Feb. 3, 1931 |
| 2,346,043 | Mysels | Apr. 4, 1944 |
| 2,522,447 | Harris | Sept. 12, 1950 |
| 2,554,476 | Werner | May 22, 1951 |
| 2,588,210 | Crisman | Mar. 4, 1952 |
| 2,710,249 | Winsette | June 7, 1955 |

OTHER REFERENCES

Fluorescent Penetrant Inspection, by Greer Ellis, pages 100 to 102 and 164, in Steel, vol. 115, No. 16, Oct. 16, 1944.

Radioactive Isotopes as Tracers, by Kramer, in Power Plant Engineering, November 1947, pages 105 to 109.

Biological Applications of Tritium, by Thompson, Nucleonics, vol. 12, No. 9, September 1954, pages 31 to 35.

Chemical and Engineering News, vol. 29, No. 25, June 18, 1951, pages 2456 and 2457.

Bradford: Radioisotopes in Industry, 1953, pages 101, 291, 292, Reinhold Publishing Corporation.

UNITED STATES PATENT OFFICE
CERTIFICATE OF CORRECTION

Patent No. 2,968,733

January 17, 1961

Vladimir Dvorkovitz et al.

It is hereby certified that error appears in the above numbered patent requiring correction and that the said Letters Patent should read as corrected below.

In the grant, line 1, name of first inventor, for "Vladimir Dvorkovits" read -- Vladimir Dvorkovitz --; in the printed specification, column 5, line 34, for "draihing." read -- draining). --.

Signed and sealed this 3rd day of October 1961.

(SEAL)
Attest:

ERNEST W. SWIDER
Attesting Officer

DAVID L. LADD
Commissioner of Patents

USCOMM-DC